United States Patent [19]

Schwartz et al.

[11] Patent Number: 4,946,508
[45] Date of Patent: Aug. 7, 1990

[54] DISAZO PYRAZOLONE PIGMENT COMPOSITIONS

[75] Inventors: Russell J. Schwartz; Manuel Z. Gregorio, both of Cincinnati, Ohio

[73] Assignee: Sun Chemical Corporation, Fort Lee, N.J.

[21] Appl. No.: 356,040

[22] Filed: May 23, 1989

[51] Int. Cl.$^5$ .............................................. C09B 27/00
[52] U.S. Cl. ............................ 106/496; 534/561; 534/740; 534/748; 534/728
[58] Field of Search ............... 534/561, 740, 748, 729; 106/496

[56] References Cited

U.S. PATENT DOCUMENTS

| | | | |
|---|---|---|---|
| 3,567,707 | 3/1971 | Neave et al. | 106/496 |
| 3,671,281 | 6/1972 | Doss | 534/756 |
| 4,113,721 | 9/1978 | Hauser et al. | 534/729 |
| 4,341,701 | 7/1982 | Pechey et al. | 534/584 |
| 4,643,770 | 2/1987 | Hayes | 106/496 |

FOREIGN PATENT DOCUMENTS 1344767 10/1987 U.S.S.R. .
2009210 6/1979 United Kingdom .

*Primary Examiner*—Paul Lieberman
*Assistant Examiner*—Helene Klemanski
*Attorney, Agent, or Firm*—Jack Matalon

[57] ABSTRACT

Disazo pyrazolone pigments are provided which have improved properties achieved by incorporating certain azomethine compounds. The pigment is prepared by reacting a primary amine terminated alkylene oxide polymer and acetoacetanilide or substituted acetoacetanilide to form an azomethine coupler, and subsequently co-reacting the azomethine coupler and a pyrazolone coupler with tetrazotized 3,3'-dichlorobenzidine or tetrazotized o-dianisidine. The pigment is useful in printing ink, plastics and paints.

11 Claims, No Drawings

DISAZO PYRAZOLONE PIGMENT COMPOSITIONS

BACKGROUND OF THE INVENTION

1. Field of Invention

The present invention relates to pigments.

2. Description of the Related Art

Disazo pyrazolone pigments, including Pigment Orange 13, Pigment Orange 34, Pigment Red 37, Pigment Red 38, Pigment Red 41, and Pigment Red 42, represent a class of general purpose colorants. They are utilized in a relatively broad range of applications, including plastics, solvent-based inks, water-based inks, solvent-based paints and water-based paints. Those having Colour Index identifications comprise the aforementioned examples and are represented as follows:

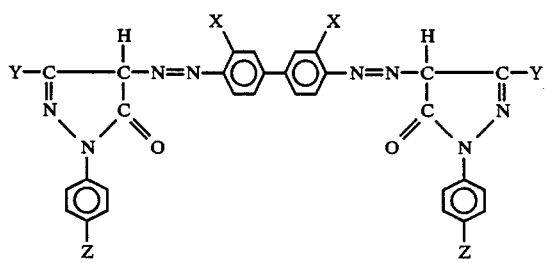

wherein in the following pigments the X, Y and Z groups are the following:

| | | | |
|---|---|---|---|
| Orange 13 | X = Cl, | Y = CH$_3$, | Z = H |
| Orange 34 | X = Cl, | Y = CH$_3$, | Z = CH$_3$ |
| Red 37 | X = OCH$_3$, | Y = CH$_3$, | Z = CH$_3$ |
| Red 38 | X = Cl, | Y = COOC$_2$H$_5$, | Z = H |
| Red 41 | X = OCH$_3$, | Y = CH$_3$, | Z = H |
| Red 42 | X = OCH$_3$, | Y = COOC$_2$H$_5$, | Z = H |

The prior art literature pertaining to the preparation of improved disazo pyrazolone pigments, though not extensive, does address the objective. Thus, U.S. Pat. No. 4,341,701 (Ciba Geigy) describes the preparation of improved pyrazolone pigments by using a two-stage coupling technique. The advantages cited include higher coloring power, purity, dispersability, and transparency in many applications, including plastics, oil-based printing inks, gravure inks and paints. U.S. Pat. No. 3,671,281 teaches that a pyrazolone red pigment can be improved by heating in the presence of aniline, and GB No. 2,009,210 describes certain amine treatments to increase opacity for use in paints. SU No. 1344767 describes an improved process for manufacture of Orange 13 by the use of specified surfactants in order to reduce the cost.

SUMMARY OF THE INVENTION

It is an object of the present invention to provide significantly improved disazo pyrazolone pigments by incorporating certain azomethine compounds. The pigment compositions of the invention exhibit higher coloring strength, cleaner shades, lower rheology, and enhanced gloss compared with conventional pigment compositions, or those of the prior art. These pigment compositions are useful in all applications where disazo pyrazolone pigments are utilized, including plastics, paints, and printing inks.

The foregoing and other objects are achieved by providing an azomethine composition of matter comprising the compounds represented by the following formulae:

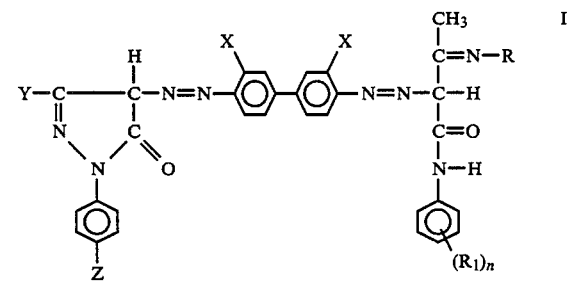

and

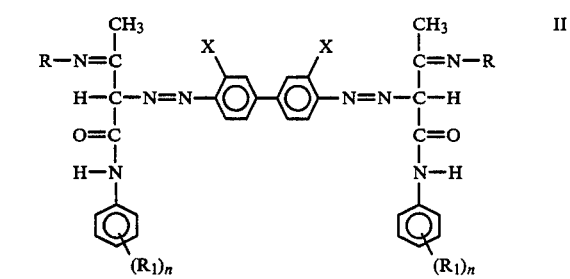

wherein:
X is OCH$_3$ or Cl
Y is CH$_3$ or COOC$_2$H$_5$;
Z is CH$_3$ or H;
R is an alkylene oxide polymer;
R$_1$ is H, CH$_3$, Cl, OCH$_3$, or OCH$_2$CH$_3$; and
n in a integer from 1 to 5. The alkylene oxide polymer is preferably ethylene oxide or propylene oxide polymer, and most preferably an ethylene oxide/propylene oxide copolymer. A pigment composition is also provided comprising disazo pyrazolone pigment and the above azomethine composition of matter of formula I. The pigment is preferably Orange 13, Orange 34, Red 37, Red 38, Red 41 and Red 42. The pigment composition is preferably prepared by reacting a primary amine terminated, alkylene oxide polymer and aetoacetanilide or substituted acetoacetanilide to form an azomethine coupler. This coupler and a pyrazolone coupler are then coreacted with tetrazotized 3,3-dichloro-benzidine or o-diansidine.

DETAILED DESCRIPTION OF THE PREFERRED EMBODIMENTS

The modified disazo pyrazolones of the present invention are produced by forming an azomethine coupler from a primary amine terminated alkylene oxide polymer and an acetoacetanilide or substituted acetoacetanilide, and subsequently co-reacting the azomethine coupler and a pyrazolone coupler with tetrazotized 3,3'-dichlorobenzidine or tetrazotized o-dianisidine The resulting pigment composition contains I or a mixture of I and II and the corresponding disazo pyrazolone pigment. The primary amine terminated alkylene oxide polymer (or oligomer) is preferably an ethylene oxide polymer, propylene oxide polymer, or ethylene oxide/propylene oxide copolymer. The primary amine terminated alkylene oxide polymer (or oligomer) has a molecular weight range of about 200 to about 50,000, preferably about 400 to about 15,000. Examples of these types of compounds are the Jeffamine M series manufactured by Texaco Chemical Corporation. These amines have the following general formula:

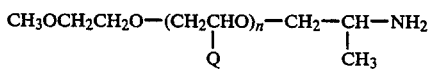

wherein:
n=about 4 to about 200; and
Q=H or CH₃

The modifying amines may include other various moieties, but must contain a primary amine. Examples of other moieties include secondary and/or tertiary amines in addition to carboxylic acid, hydroxyl, ester, other functionalities and mixtures thereof.

The acetoacetanilide coupler from which the azomethine coupler is produced can be acetoacetanilide or any substituted acetoacetanilide, including acetoacet-m xylidide, acetoacet-o-toluidi acetoacet-o-anisid and acetoacet-2,5-dimethoxy-4-chloranilide.

The resulting azomethine modified pigments should be present in the pigment composition in an amount which will effect the improved results of the invention. Preferably this amount will be up to about 50 wt. % based upon the weight of the pigment product, and most preferably in an amount between about 5 and 30 wt. %. The pigment compositions may also contain resins, such as rosin, at comparable levels.

The following reaction scheme generally illustrates how the pigment compositions of this invention are produced:

Azomethine Formation

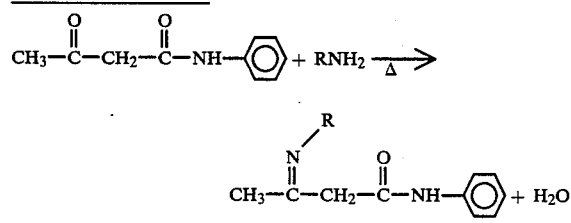

Tetrazonium Salt Formation

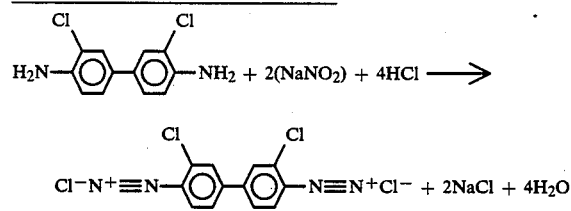

Azomethine Modified Pigment Formation

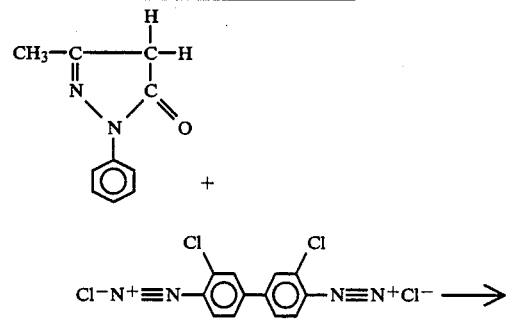

-continued

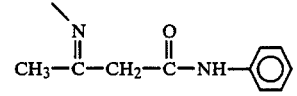

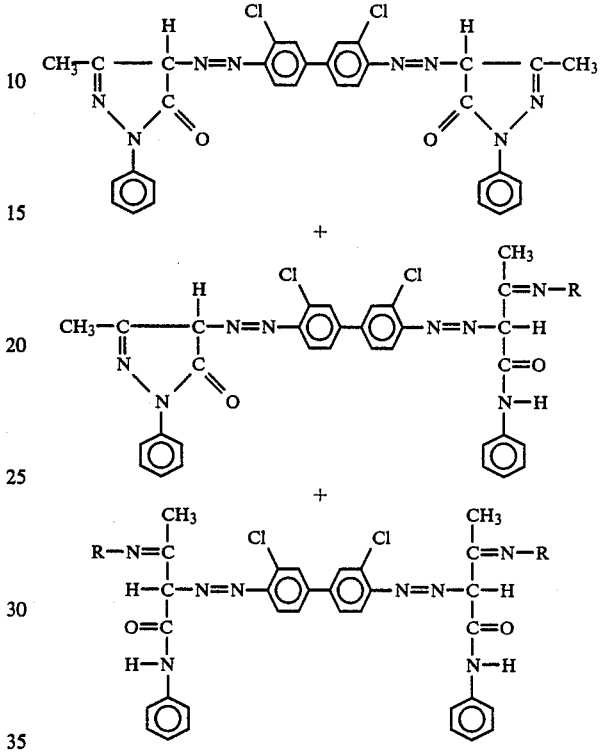

To further illustrate how disazo pyrazolone pigments may be modified in accordance with the present invention, the following examples set forth methods whereby pigment composition were produced:

EXAMPLE 1

Tetrazotized 3,3' dichlorobenzidine (DCB) was prepared by charging 17.5 parts of DCB to 100 parts of an ice/water mixture and 32.1 parts of 20° Be HCL, with constant stirring, to form a homogeneous suspension. To this was then added 35.7 parts of a 28% aqueous solution of sodium nitrite and stirring continued for 1 hour at a temperature of 0°–5° C. After one hour, excess nitrous acid was destroyed with the addition of approximately 0.5 parts of sulfamic acid A fine suspension of 1-phenyl-3-methyl-5-pyrazolone (PMP) was prepared by charging 25.2 parts of PMP to 400 parts of H₂O and 13.1 parts of 50% aqueous sodium hydroxide, and the mixture was stirred until all the PMP was dissolved. The PMP was then precipitated by the slow addition of 15 parts of 70% acetic acid.

An azomethine coupling component (I) was formed by charging 0.7 parts of acetoacetanilide (AAA) to 7.9 parts of Jeffamine-M-2070 (Texaco Chemical Corp.), and heating the mixture to 100°–105° C. while stirring. After one hour, the reaction was complete as evidenced by the disappearance of the ketone absorption band in the IR spectrum at 1673 cm⁻¹.

Formation of the Orange 13 pigment composition of the invention was then achieved by the simultaneous addition of the tetrazotized DCB and the azomethine compound (I) to the PMP suspension over a period of 70 minutes. Stirring was continued until no excess tetrazotized DCB remained, and then the slurry was heated to 90°-95° C., stirred on additional 15 minutes, filtered, washed, and dried in an oven at 60° C., to give 51.0 parts of an Orange 13 pigment composition.

Evaluation was performed by charging 25 parts of the pigment to 75 parts of a water-based ink vehicle containing a commercial grade acrylic resin (Joncryl 67; S. C. Johnson) and 300 parts of ⅜th inch stainless steel balls. The mixture was placed on a "Red Devil" paint shaker for 30 minutes, to produce a mill base. The viscosity of the mill base was approximately one-half of that of an conventional Pigment Orange 13 mill base. Water flexo inks were prepared by letting back the mill bases with additional vehicle to a pigment content of 9.0%. The pigment produced an ink that was approximately 30% stronger, glossier and more transparent than those prepared from the conventional Pigment Orange 13.

To demonstrate the versatility of the invention, evaluation was also performed in a C-Type packaging gravure ink by charging 25 parts of pigment to 75 parts of a RS-nitrocellulose-based grind vehicle with 300 parts of ⅜th inch stainless steel balls. The mixture was placed on a "Red Devil" paint shaker for 30 minutes to afford a mill base, which was then further letdown with 180 parts of a typical maleic resin solution containing toluene and isopropyl alcohol. The ink was then adjusted to print viscosity (22 seconds through a #2 Zahn cup) by the addition of isopropyl acetate. Compared with an ink made from conventionally prepared Orange 13, the ink of this invention was 30% stronger, glossier, more transparent, and lower in rheology.

EXAMPLE 2

The procedure of Example 1 was repeated except using 26.5 parts of 1-(p-tolyl)-3-methyl-5-pyrazolone in place of the 25.2 parts of 1-phenyl-3-methyl-5-pyraplace zolone, to afford 53.0 parts of an Orange 34 pigment composition.

Evaluation of this pigment composition in both the water flexo and C-type packaging gravure ink systems of Example 1 gave similar improvements over a conventional Orange 34 made without the azomethines of this invention.

EXAMPLE 3

Tetrazotized o-dianisidine (ODA) was prepared by charging 19.5 parts of ODA to 100 parts of an ice/water mixture and 37.1 parts of 20° Be HCl, with constant stirring to form a homogeneous suspension. To this was added 12.1 parts of sodium nitrite and stirring was continued for 90 minutes at a temperature of 0°-5° C. Remaining nitrous acid was eliminated with the addition of approximately 0.5 parts of sulfamic acid.

A fine suspension of 1-(p-tolyl)-3-methyl-5pyrazalone (PTMP) was prepared according to the procedure of Example 1 using 30.8 parts of PTMP, 600 parts of water, 15.0 parts of 50% aqueous sodium hydroxide, and 17.0 parts of 70% acetic acid.

Formation of an improved Pigment Red 37 was then achieved by the simultaneous addition of the tetrazotized ODA and 9.4 parts of azomethine compound (I) to the PTMP suspension over a period of 70 minutes, while maintaining a ph of 5.2-5.6 by the addition of dilute aqueous sodium hydroxide. Stirring was continued until no excess tetrazotized ODA remained, and then the slurry was heated to 90°-95°, stirred an additional five minutes, cooled to 70° C., filtered, washed with water, and dried in an oven at 60° C. to give 61 parts of a Pigment Red 37 composition.

Evaluation of this pigment composition in both the water flexo and C-type packaging gravure ink systems of Example 1 gave similar improvements over a Pigment Red 37 prepared without the azomethine compound of this invention.

EXAMPLE 4

The procedure of Example 3 was repeated except using 28.4 parts of 1-phenyl-3-methyl-5-pyrazolone (PMP) in place of the 1-(p-tolyl)3-methyl-5-pyrazolone (PTMP) to afford 58.0 parts of a similarly improved Pigment Red 41.

EXAMPLE 5

The procedure of Example 1 was repeated except using an azomethine coupling component (II) made from 0.7 parts acetoacetanilide and 7.9 parts of Jeffamine M2005 (Texaco Chemical Corp.), to give 51.0 parts of an Orange 13 pigment composition having increased gloss and transparency in C-type gravure packaging ink, compared with the Orange 13 of Example 1.

EXAMPLE 6

The procedure of Example 5 was repeated except that 12.0 parts of Rosin were added to the pigment slurry at 90°-95° C., prior to filtration. The resulting Pigment Orange 13 composition showed greatly enhanced strength and dispersability for the coloration of polyvinylchloride (PVC).

While certain representative embodiments and details have been shown for the purpose of illustrating the invention, it will be apparent to those skilled in this art that various changes may be made therein without departing from the spirit or scope of the invention.

What is claimed is:

1. An azomethine composition of matter having the formula:

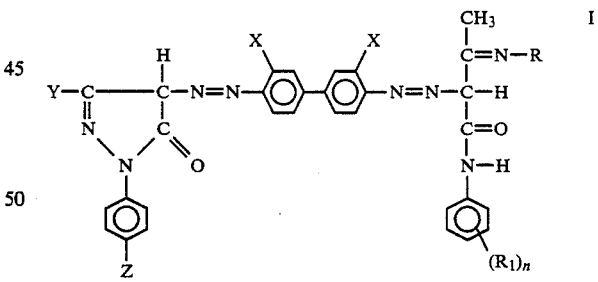

wherein:
X is $OCH_3$ or Cl;
Y is $CH_3$ or $COOC_2H_5$;
Z is $CH_3$ or H;
R is an alkylene oxide polymer containing about 4 to about 200 groups;
$R_1$ is H, $CH_3$, Cl, $OCH_3$ or $OCH_2CH_3$; and
n is an integer from 1 to 5.

2. The azomethine of claim 1, wherein the polymer is an ethylene oxide polymer.

3. The azomethine of claim 1, wherein the polymer is a propylene oxide polymer.

4. The azomethine of claim 1, wherein the polymer is a copolymer of ethylene oxide and propylene 5. A disazo pyrazolone pigment composition, comprising disazo pyrazolone pigment and an azomethine composition of matter having the formula:

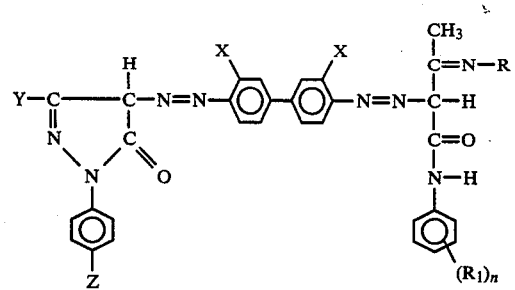

wherein:

X is OCH$_3$ or Cl;

Y is CH or COOC$_2$H$_5$;

Z is CH$_3$ or H;

R is an alkylene oxide polymer containing about 4 to about 200 groups;

R$_1$ is H, CH$_3$, Cl, OCH$_3$ or OCH$_2$CH$_3$; and n is an integer from 1 to 5.

6. The pigment composition of claim 5, wherein the azomethine composition of matter is present in the composition in an amount not more than 50 wt. %.

7. The pigment compositions of claim 6, wherein the azomethine composition of matter is present in the composition in an amount between about 10 wt. % to about 30 wt. %.

8. The pigment composition of claim 5, wherein the disazo pyrazolone pigment is selected from the group consisting of Orange 13, Orange 34, Red 37, Red 38, Red 41 and Red 42.

9. The pigment composition of claim 5, wherein the polymer is an ethylene oxide polymer.

10. The pigment composition of claim 5, wherein the polymer is a propylene oxide polymer.

11. The pigment composition of claim 5, wherein the polymer is a copolymer of ethylene oxide and propylene oxide.

* * * * *